T. T. PEARSON.
Steam-Generators for Cooking, &c.
No. 158,516. Patented Jan. 5, 1875.
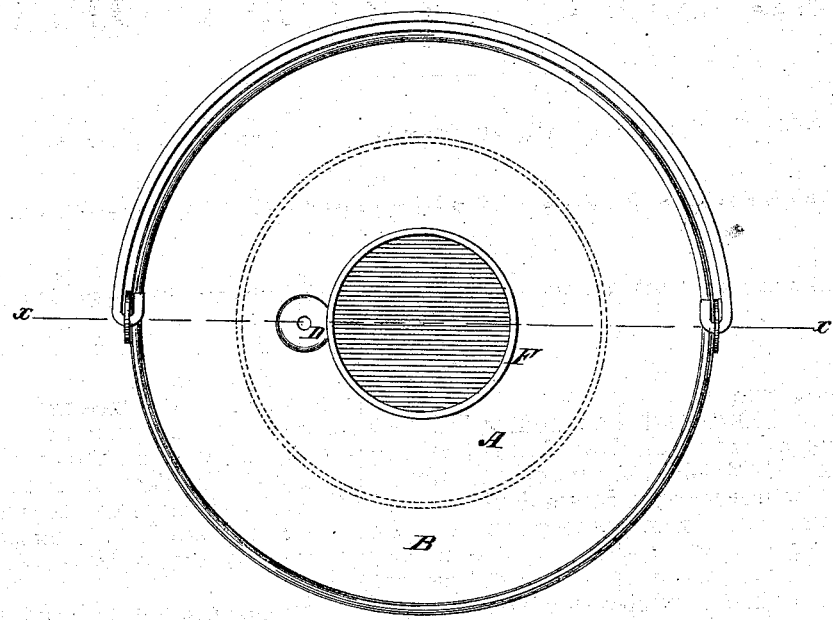
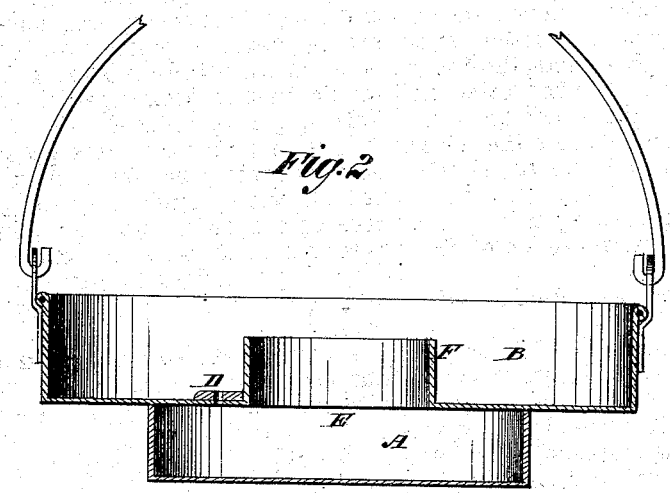
WITNESSES:
INVENTOR:
BY
ATTORNEYS.

ated January 5, 1875; application filed
UNITED STATES PATENT OFFICE.

THOMAS T. PEARSON, OF HOPEWELL CORNERS, CANADA.

IMPROVEMENT IN STEAM-GENERATORS FOR COOKING, &c.

Specification forming part of Letters Patent No. 158,516, dated January 5, 1875; application filed May 9, 1874.

*To all whom it may concern:*

Be it known that I, THOMAS T. PEARSON, of Hopewell Corners, Albert county, New Brunswick, in Dominion of Canada, have invented a new and useful Improvement in Steam-Generator for Cooking and other purposes, of which the following is a specification:

The object of this invention is to furnish cheap and convenient means for steaming food and other articles on cooking-stoves and in other places; and it consists in a steamer having two compartments or chambers, the upper of which contains water, and in the lower one the steam is generated, the water being allowed to pass through a hole into the lower chamber only as fast as it is converted into steam.

In the accompanying drawing, Figure 1 is a top view. Fig. 2 is a vertical section of Fig. 1, taken on the line $x\ x$.

Similar letters of reference indicate corresponding parts.

A is the generating-chamber. B is the water-compartment. The compartment A is designed to fit in a hole in a stove, and generate steam, by the heat of the stove, from water which passes through the small hole D. The two chambers A and B are connected by the central aperture E. This aperture is surrounded by the short tube F, which rises sufficiently high in the compartment D to exclude the water from the generating-chamber A.

The article to be cooked or steamed is placed in steaming-vessel having a perforated bottom. This steamer is placed on the top of the short tube F, and receives the steam from the chamber A. The water which passes through the hole D is at once converted into steam, so that no body of water is allowed to remain in the generator.

By this arrangement steam is generated, and the cooking commences immediately after the generator is placed over the fire. There being no large body of water to heat, the time required for cooking vegetables and other articles is greatly reduced.

It is apparent that this generator may be used for other purposes than cooking. I do not, therefore, confine myself exclusively to cooking purposes, but design it for all the purposes for which it may be adapted.

Having thus described my invention, I claim as new and desire to secure by Letters Patent—

A steam-generator for cooking and other purposes, constructed substantially as described—that is, having a generating-chamber, A, a water-chamber, B, aperture E, tube F, and hole D, arranged to operate as described.

THOMAS TOBIAS PEARSON.

Witnesses:
 CHARLES A. MCLANE,
 WILLIAM C. PIPES.